May 21, 1940.   D. HOPPENSTAND   2,201,293
BRAKE
Filed Sept. 29, 1937   2 Sheets-Sheet 1

INVENTOR
David Hoppenstand
by his attorneys
Stebbins, Blenko & Parmelee

May 21, 1940. D. HOPPENSTAND 2,201,293
BRAKE
Filed Sept. 29, 1937    2 Sheets-Sheet 2

INVENTOR
David Hoppenstand
by his attorneys
Stebbins, Blenko & Parmelee

Patented May 21, 1940

2,201,293

UNITED STATES PATENT OFFICE 2,201,293

BRAKE

David Hoppenstand, Fox Chapel, Pa.

Application September 29, 1937, Serial No. 166,316

2 Claims. (Cl. 188—76)

This invention relates to brakes and, in particular, to a brake which is well suited for automotive vehicles although not limited to that specific field, having numerous other applications as well.

Automotive brakes as most widely used at present comprise a pair of levers pivoted at one end on a fixed member and adapted to be forced outwardly into engagement with the interior of a brake drum to which the vehicle wheel is secured. Brakes of this type usually require the use of brake lining on the pivoted levers, and this lining must be replaced when worn. It is usually secured to the brake levers by rivets. The latter are objectionable because they score the drum when the lining is worn down. Since the pivot on which the brake levers turn is fixed, only a relatively small portion of the area of the lining has effective braking engagement with the drum. This limits the braking action which can be exerted.

I have invented a novel form of brake which is particularly adapted for automotive use although it may be applied as well to rail cars, industrial applications, etc. In accordance with my invention I provide brake levers pivoted adjacent their mid-point and provided with shoes adjacent their ends for engagement with the interior and exterior respectively of a brake drum. This construction is characterized by numerous advantages over that now most widely used. These advantages will become apparent as the description of the invention proceeds. A typical embodiment of the invention is illustrated in the accompanying drawings, although it is to be understood that it may also be embodied in forms other than that shown. In the drawings:

Figure 1:
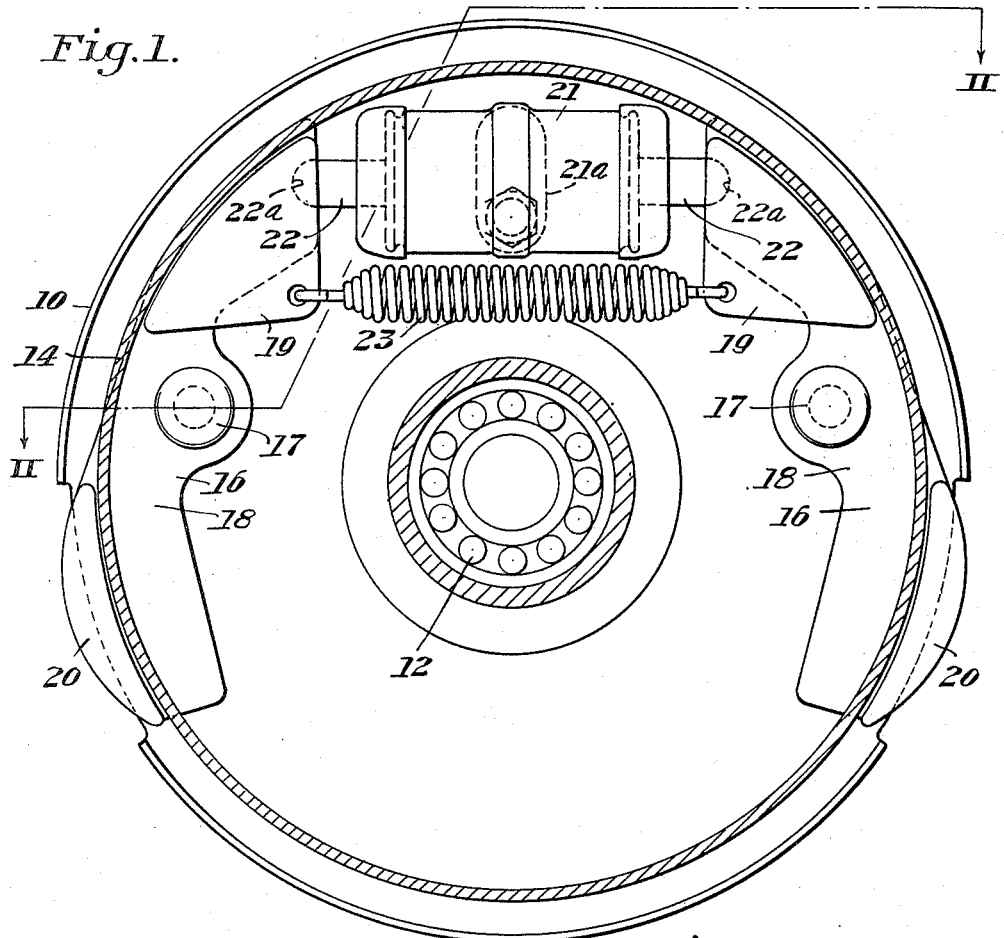
Figure 1 is a sectional view taken on a plane perpendicular to the axis of the brake drum and just inside the disk portion of the drum.
Figure 2:
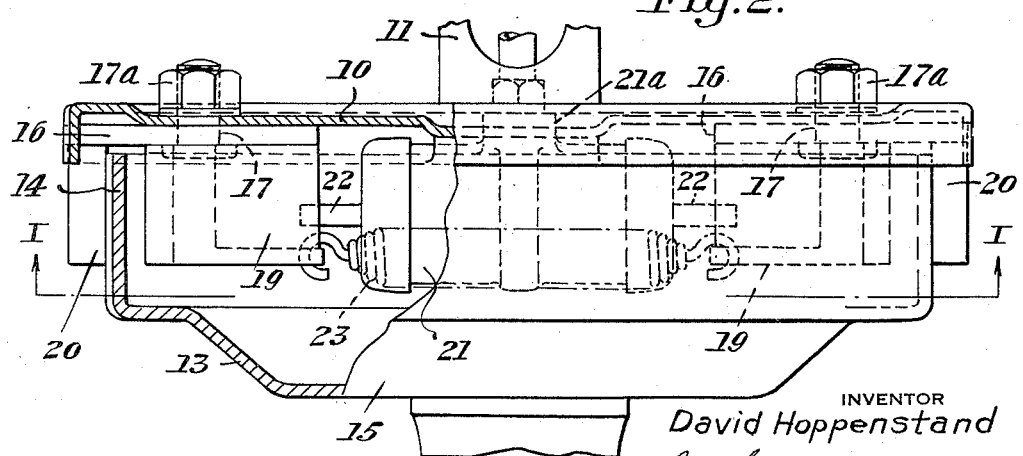
Figure 2 is a sectional view taken on the line II—II of Fig. 1; line I—I of Fig. 2 indicates the plane on which the section shown in Fig. 1 is taken.
Figure 3:
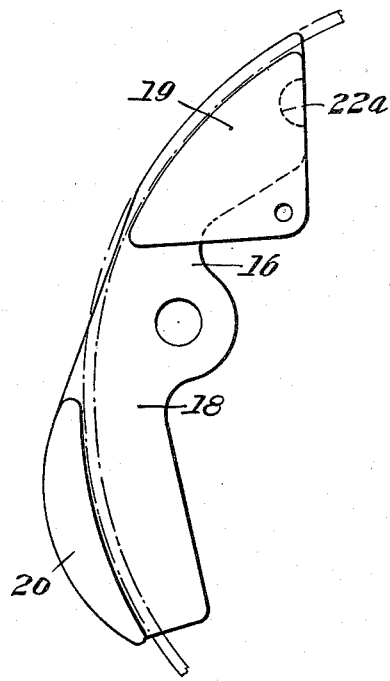
Figure 3 is a side elevation of a brake lever according to my invention.
Figure 4:
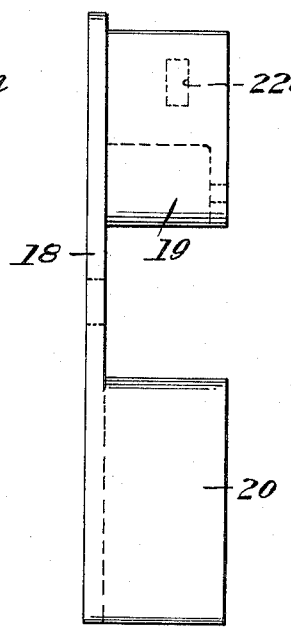
Figure 4 is an end view as would be seen by looking from the left in Fig. 3.
Figure 5:
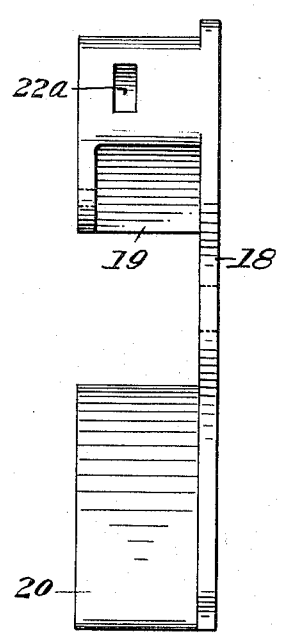
Figure 5 is an end view such as would be seen by looking from the right in Fig. 3.

Referring now in detail to the drawings, Figs. 1 and 2 show the brake incorporated in the front wheel of an automotive vehicle. A supporting plate or brake mounting disk 10 is secured to a steering knuckle 11 in any convenient manner and is provided with bearings 12 for the wheel spindle (not shown). In the case of the rear wheels, the plate 10 is secured to the end of the rear axle housing.

A brake drum 13 has a rim portion 14 and a hub portion 15 to which a wheel (not shown) is removably secured, by bolts for example.

Brake levers 16 are pivotally mounted intermediate their ends on pins 17 having threaded ends extending through holes in the plate 10 for the reception of nuts 17a. The levers 16 consist generally of a flat plate-like portion 18 and shoes 19 and 20 upstanding therefrom adjacent the ends of the levers. These shoes may be formed integral with the plate-like portion of the levers or may be separately formed and attached thereto as by rivets or the like.

The shoes 19 are adapted to engage the interior surface of the rim 14 of the drum 13. The shoes 20 are similarly adapted to engage the exterior surface of the drum. The shoes may be of any desired metal. In accordance with a modification of my invention shortly to be described, the shoes may also be of non-metallic material.

Brake lever actuating means 21 in the form of a hydraulic cylinder having twin pistons reciprocable therein, is provided for effecting angular movement of the levers 16 to cause engagement of the shoes 19 and 20 with the drum. Brake actuating devices such as indicated at 21 are well known so that no specific description of the latter is necessary. A connection 21a carried by the cylinder provides for the attachment of a conduit leading to any suitable pressure generating system. The pistons reciprocable in the cylinder 21 have fingers 22 thereon with rounded outer ends seated in recesses 22a formed in the shoes 19. It will be clear from the construction so far described that the admission of fluid under pressure, to the cylinder 20, causes the fingers 22 to move outwardly and force the shoes 19 against the interior of the drum 13. The shoes 20 simultaneously engage the exterior of the drum. A tension spring 23 retracts the brake levers to their illustrated positions upon the release of the pressure in the cylinder 20, thus releasing the brakes.

Figure 6:
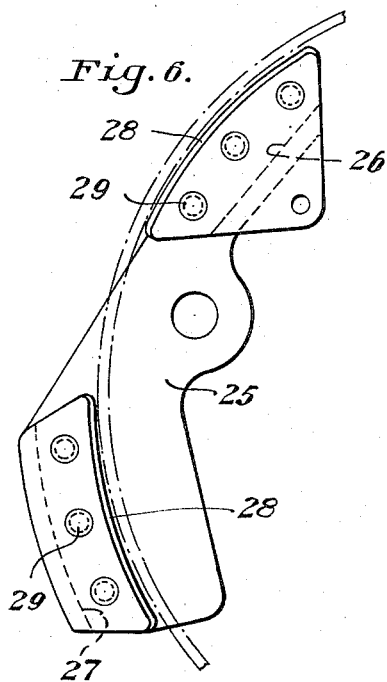
Figures 6 and 7 are similar to Figs. 3 and 4 showing another modification of the invention.
Figure 7:
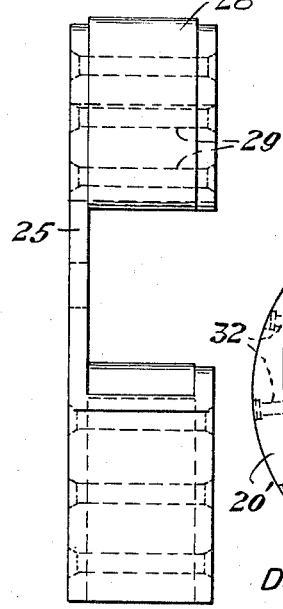

Referring now more particularly to Figs. 6 and 7, a brake lever 25 there shown, is similar to the levers 16 in general but is provided with pockets 26 and 27 adjacent its ends. The pockets 26 and 27 are adapted to receive separately formed brake shoes or blocks 28. The blocks 28 may be of hard carbon or other similar material and are secured in their pockets by rivets 29 extending through the side walls of the pockets.

Figure 8:
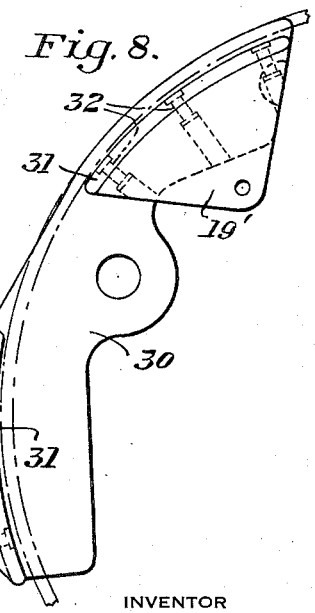
Figure 8 is a view similar to Fig. 5 showing further modification.

A further modification is shown in Fig. 8, and comprises a lever 30 similar to those shown at 16 except that the shoes 19' and 20' are adapted to receive brake lining segments 31. Rivets 32 secure the lining segments 31 to the shoes.

The advantages of the invention will be largely apparent from the foregoing description. In the first place, the engagement of the brake drum exteriorly and interiorly by the shoes carried on my center pivoted brake levers affords a braking action much more positive and effective than can be secured with brakes of the construction previously employed. The combined effect of the interior and exterior shoes is to seize the drum and exert a powerful retarding action thereon. Special surfacing material for the brake shoes may be dispensed with although it may be employed, if desired, as shown in Fig. 8. The brake shoes thus may be metallic or nonmetallic and in either case are characterized by long life without the necessity for frequent replacement.

A further advantage of the invention is that it is self adjusting, any wear on the brake shoes being immediately taken up by increased movement of the actuating mechanism.

A further advantage of the construction described is that it may be incorporated in vehicles with little or no change, and requires almost no departure from manufacturing practice which is an accepted standard in this field. The invention is also characterized by greater quietness of operation than previous brakes. The construction, furthermore, is as simple as or simpler than that of brakes used heretofore for similar applications.

While I have illustrated herein but a preferred embodiment of the invention with certain modifications, it will be understood that changes in the construction disclosed may be made without departing from the spirit of the invention or the scope of the appended claims.

I claim:

1. A brake comprising a fixed support, a brake drum mounted for rotation adjacent said support, brake levers pivoted on said support adjacent said drum and on opposite sides of the axis of rotation thereof, shoes on said levers overlying the inner and outer surfaces of said drum, the shoes which overlie the inner surface of the drum being disposed adjacent each other, and extensible means disposed between and abutting both the last-mentioned shoes.

2. A brake comprising a fixed support, a brake drum mounted for rotation adjacent said support, brake levers pivoted on said support adjacent said drum and on opposite sides of the axis of rotation thereof, shoes on said levers overlying the inner and outer surfaces of said drum, said levers being so disposed that the shoes which overlie the inner surface of the drum are adjacent each other, and extensible means between said last-mentioned shoes effective to force them outwardly against the drum.

DAVID HOPPENSTAND.